(12) United States Patent
Miyauchi et al.

(10) Patent No.: US 6,350,069 B1
(45) Date of Patent: Feb. 26, 2002

(54) FOCAL-PLANE SHUTTER FOR CAMERA

(75) Inventors: Osamu Miyauchi; Chiaki Nemoto; Makoto Mikami, all of Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/583,309

(22) Filed: May 30, 2000

(30) Foreign Application Priority Data

May 31, 1999 (JP) ............................................. 11-152611

(51) Int. Cl.⁷ ................................................. G03B 9/40
(52) U.S. Cl. ...................................... 396/486; 396/487
(58) Field of Search ................................ 396/484, 485, 396/486, 487, 488, 452

(56) References Cited

U.S. PATENT DOCUMENTS 4,150,890 A * 4/1979 Nakagawa et al. ......... 396/486

* cited by examiner

Primary Examiner—David M. Gray
Assistant Examiner—Rochelle Blackman
(74) Attorney, Agent, or Firm—Adam & Wilks

(57) ABSTRACT

To prevent a front end of a slit forming sector of one of an open shutter sector group and a close shutter sector group from colliding with an upper edge portion of a partition opening of a partition plate and preventing leakage of light, a partition plate is provided with a partition plate opening and a projection is formed on the partition plate for preventing sector collision. The projection is formed slightly lower than the level of the upper edge portion of the partition plate opening so that immediately before a slit forming sector of the close shutter sector group comes into contact with the upper edge portion of the partition plate opening, a front end of the slit forming sector rides over the projection and is displaced from the upper edge portion of the partition plate opening. When the slit forming sector is fully closed, a lower face of the front end of the slit forming sector is separated from the projected portion and is brought into close contact with the partition plate by its own elastic force.

14 Claims, 3 Drawing Sheets

FOCAL-PLANE SHUTTER FOR CAMERA

BACKGROUND OF THE INVENTION

1. Field of the Invention

The present invention relates generally to a focal-plane shutter for a camera and, more particularly, to a focal-plane shutter having a structure effective for preventing a slit forming sector from colliding with an edge portion of a shutter opening.

2. Description of the Related Art

In a conventional focal-plane shutter for a camera, an open shutter sector group comprising a plurality of shutter sectors is provided rearward of a base plate having a shutter opening, a partition plate having a partition plate opening is arranged rearward of the open shutter sector group, a close shutter sector group comprising a plurality of shutter sectors is provided rearward of the partition plate and a sector holding plate having a holding plate opening is provided rearward of the partition plate via a sliding plate. Further, the open shutter sector group and the close shutter sector group respectively execute the operation of opening and closing the respective openings of the base plate, the partition plate and the sector holding plate by moving the respective shutter sectors by different displacement amounts by use of a plurality of arms respectively having parallel link mechanisms. (An example of such a structure is disclosed, for instance, in Japanese Patent Laid-Open No. 20534/1995). The open shutter sector group and the close shutter sector group each comprise one slit forming sector and a plurality of cover sectors.

The structure of the close shutter sector group and the partition plate is illustrated in FIG. 2. A close shutter sector group 4 comprises a single sheet of a slit forming sector 41 and three other sheets of cover sectors 42, 43 and 44. When a partition plate opening 31 of a partition plate 3 is closed by the close shutter sector group, the slit forming sector 41 is moved prior to the other cover sectors 42, 43 and 44, the other cover sectors follow the slit forming sector 41 and the respective sectors are moved by different displacement amounts to thereby execute operation of completely closing the partition plate opening 31 of the partition plate 3.

Meanwhile, when the partition plate opening 31 of the partition plate 3 is closed by the close shutter sector group 4, the respective shutter sectors 41 through 44 move from a lower end portion of the partition plate opening 31 in an upward direction, and there is a case in which a front end edge portion 41a in the moving direction of the slit forming sector 41 collides with an upper end portion (upper edge portion) 31a of the partition opening 31. Therefore, there is a case in which the upper end portion 31a of the partition opening 31 or the front end edge portion 41a of the slit forming sector 41 may be damaged. In order to prevent the collision, as shown in FIG. 2, there has been proposed a construction in which the upper edge portion 31a of the partition plate opening 31 is formed in a shape of a gradually-inclined slope. However, even with a construction in which the upper edge portion 31a of the partition plate opening 31 is formed in the shape of the gradually-inclined slope, the slit forming sector 41 may occasionally collide with the upper edge portion 31a of the partition plate opening 31.

Hence, there has been proposed a construction in which the partition plate 3 is formed to bend, for example, in a gradually-inclined inverse-slope type shape at a vicinity of a center line in a vertical direction in FIG. 2 to thereby provide a small gap between the partition plate 3 and the slit forming sector 41 of the close shutter sector group 4. However, an unavoidable problem occurs due to the leakage of light when such a gap is present.

SUMMARY OF THE INVENTION

In order to resolve the above-described problems associated with the previously-proposed structure, the present invention provides a focal-plane shutter for a camera having a projected portion for preventing sector collision, the projected portion being disposed at one of a base plate, a partition plate, and a sector holding plate, the position of the projected portion being a position into which a slit forming sector is brought into contact immediately before the slit forming sector reaches an end portion of an opening and from which the slit forming sector is separated in a state in which the shutter sector group stops closing the opening.

By the foregoing construction, collision between a front end of the slit forming sector and the end portion of the opening of the partition plate or the like can be prevented with a degree of certainty and the leakage of light through the shutter is also prevented.

DETAILED DESCRIPTION OF THE PREFERRED EMBODIMENTS

A characteristic feature of a focal-plane shutter for a camera according to the present invention resides in the fact that the focal-plane shutter has an open shutter sector group provided on a back face side of a base plate having a shutter opening, a partition plate having a partition plate opening arranged on a back face side of the open shutter sector group, a close shutter sector group provided on a back face side of the partition plate, and a sector holding plate having a holding plate opening provided on a back face side of the close shutter sector group. The open shutter sector group and the close shutter sector group respectively execute an operation of opening and closing the shutter opening by use of plural arms respectively having parallel link mechanisms. A projected portion or projection for preventing sector collision is provided at either one of the substrate and the partition plate to which slit forming sectors of the open shutter sector group are opposed and/or either one of the partition plate and the sector holding plate to which slit forming sectors of the close shutter sector group are opposed. The projected portion is disposed at a position into which the slit forming sector is brought into contact immediately before the slit forming sector reaches an end portion of an opening of any of the opening portions and from which the slit forming sector is separated in a state in which the shutter sector group finishes closing. By this construction, even when the slit forming sector is moved at a high speed, the slit forming sector does not collide with the end portion of the opening and blocking of light in closing the shutter can sufficiently be achieved. Further, there may be provided a shutter in which arrangement of the close shutter sector group and arrangement of the open shutter sector group are switched.

Figure 1:
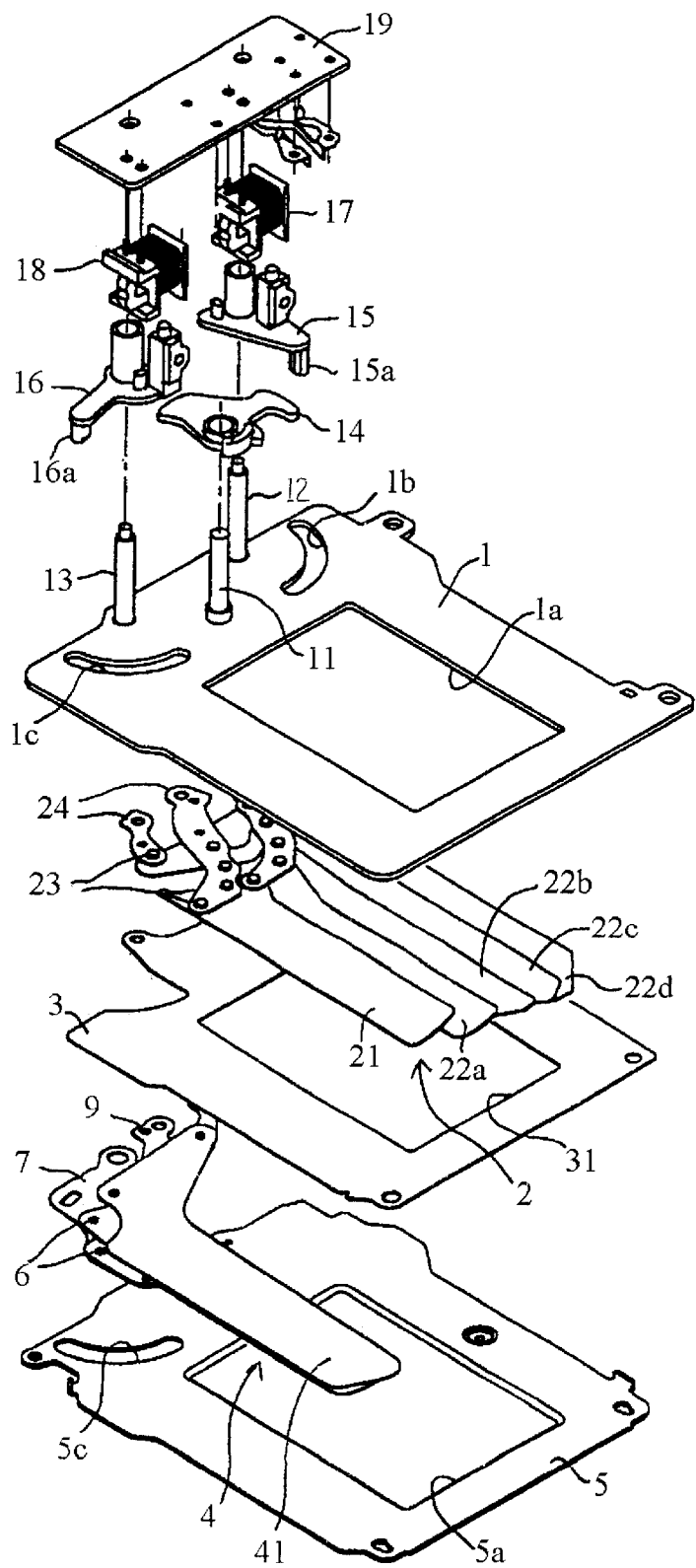
FIG. 1 is an exploded perspective view showing a focal-plane shutter in accordance with a preferred embodiment of the present invention.

Preferred embodiments of the present are now described with reference to the drawings. Referring to FIG. 1, a shutter opening 1a is formed at a base plate 1 arranged so as to be opposed to a photographing lens of a camera (not shown). The base plate 1 is erected with shafts 11, 12 and 13 and a set lever 14, an open lever 15 and a close lever 16 are pivotably supported axially by the respective shafts. The base plate 1 is formed with guide holes 1b and 1c in the shape of a semicircular arc centering on the shaft 12 and shaft 13, and drive pins 15a and 16a projecting from the open lever 15 and the close lever 16 are slidable along and traverse the guide holes 1b and 1c during movement of the levers. The open lever 15 and the close lever 16 are biased with drive springs (not shown). The two levers 15 and 16 are attracted to a respective electromagnet device 17 and 18 in a set state, and when the shutter is operated, successively, attraction of the open lever 15 is first released and attraction of the close lever 16 is released slightly thereafter under control of a circuit mounted on a circuit board 19. When the attraction has been released, the two levers are pivoted by the respective drive springs.

An open shutter sector group 2 is provided on a back face side of the base plate 1. The open shutter sector group 2 comprises a slit forming sector 21 and a plurality of cover sectors 22a through 22d. The respective open shutter sectors 21 and 22a through 22d are calked to supporting pins 23 and by rotatably fitting the supporting pins 23 to a plurality of arms 24 constituting a parallel link mechanism, the open shutter sectors are connected to and rotatably supported by the arms. A partition plate 3 is arranged on a back face side of the open shutter sector group 2 and the partition plate 3 is formed with a partition plate opening 31.

Figure 2:
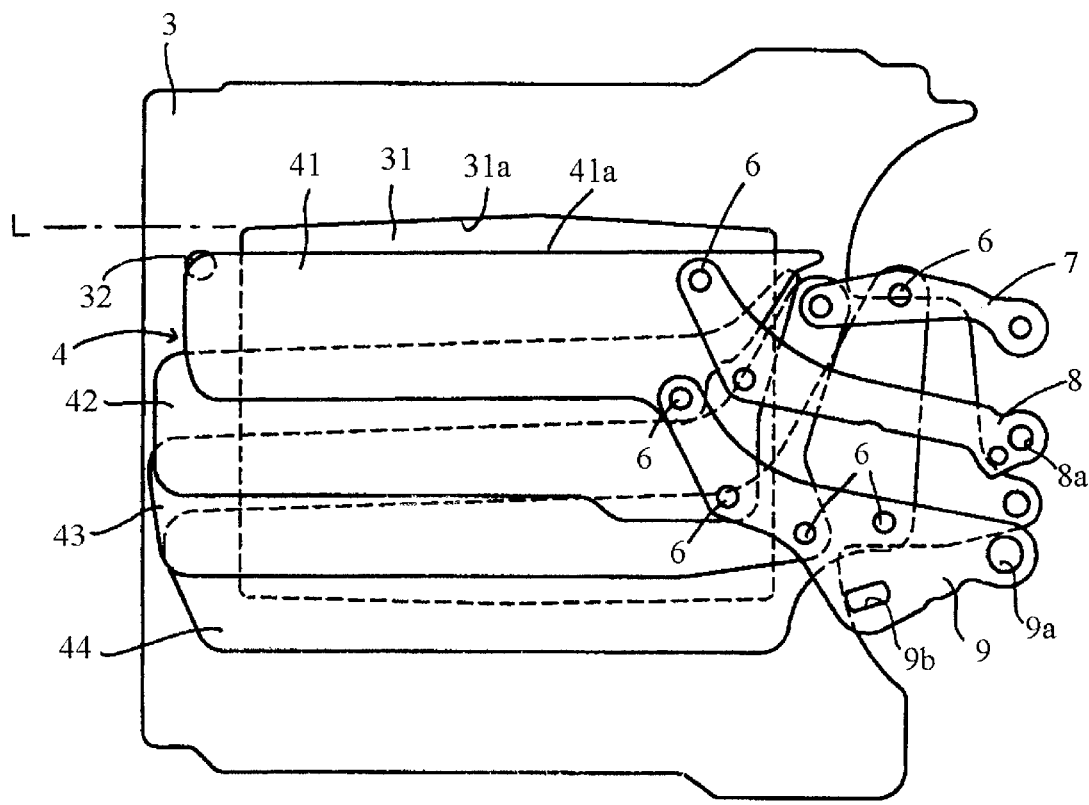
FIG. 2 is a front view of a close shutter sector group and a partition plate showing a state in which a slit forming sector rides over a projected portion.

A close shutter sector group 4 is provided on a back face side of the partition plate 3. The close shutter sector group 4 comprises a slit forming sector 41 and a plurality of cover sectors 42, 43 and 44 (FIG. 2). The respective close shutter sectors 41, 42, 43 and 44 are calked to supporting pins 6 and by fitting the supporting pins 6 to a plurality of arms 7, 8 and 9 constituting a parallel link mechanism, the close shutter sectors are connected to and rotatably supported by the arms. A sector holding plate 5 is formed with a holding plate opening 5a and is perforated with a guide hole 5c at a position opposed to the guide hole 1c provided at the base plate 1. Film (not shown) is arranged on a rear side of the holding plate opening 5a.

Figure 3:
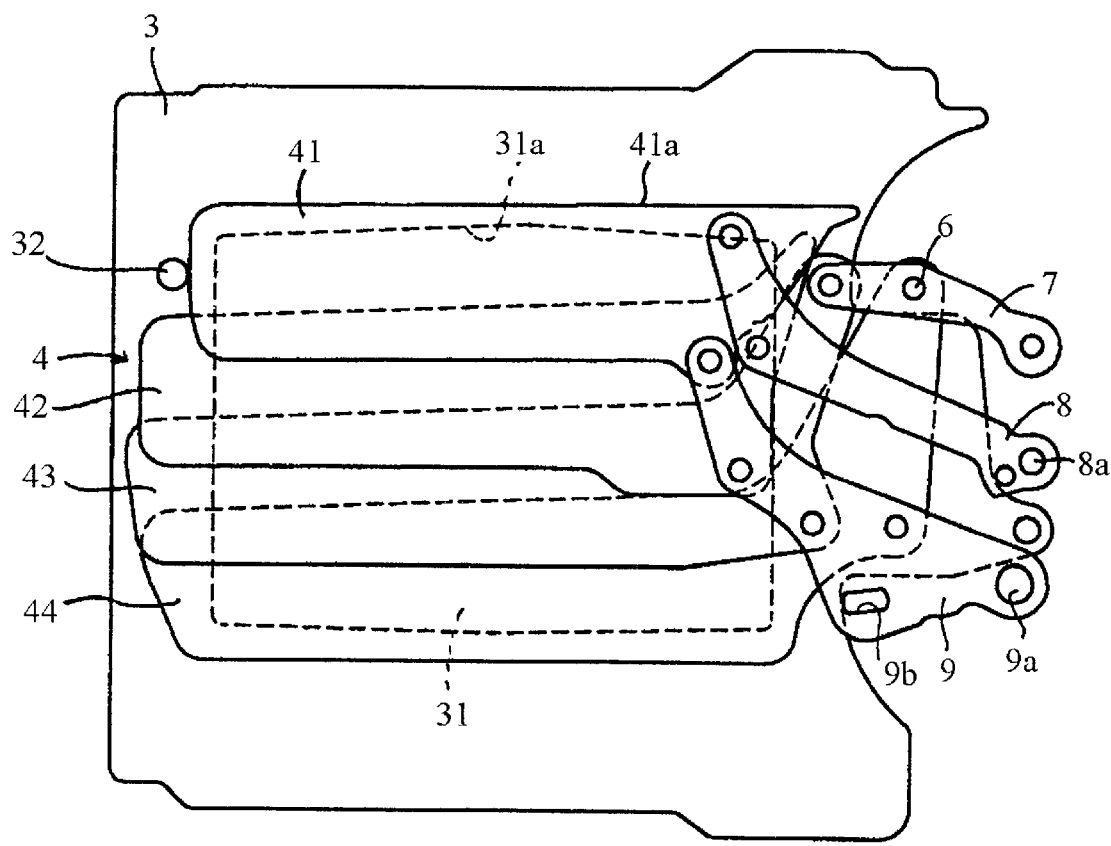
FIG. 3 is a front view of the close shutter sector group and the partition plate showing a state in which the slit forming sector is separated from the projected portion.

Next, an explanation will be made of the construction of the partition plate 3 and the close shutter sector group 4 which are characteristic features of the invention. Referring to FIG. 2 and FIG. 3, the close shutter sector group 4 disposed on the back face of the partition plate 3 comprises a single sheet of the slit forming sector 41 disposed at an uppermost portion and moved precedingly and three sheets of the cover sectors 42, 43 and 44 and the respective shutter sectors are calked to the supporting pins 6. Further, a hole 9b of the arm 9 receives therein the drive pin 16a of the close lever 16.

Meanwhile, the partition plate 3 is formed with the partition plate opening 31 which is formed substantially in a square shape as a whole and a projection 32 for preventing sector collision is formed integrally at a left side frame portion of the partition plate slightly lower than a level L of the upper edge portion 31a of the partition plate opening and a shape of a side face of the projection 32 is that of a circular arc having a gradually-inclined curve. That is, according to the position and the shape of the projection 32, immediately before the slit forming sector 41 of the close shutter sector group 4 might otherwise collide with the upper edge portion 31a of the partition plate opening 31 of the partition plate 3, a front end portion (left end portion) of the slit forming sector 41 rides over the projection 32 to raise or lift up the front end portion of the slit forming sector 41. Therefore, the back face of the front end portion of the slit forming sector 41 is separated from a face of the partition plate 3 and moved without being brought into contact with or colliding with the upper edge portion 31a of the partition plate opening 31 of the partition plate.

Further, the slit forming sector 41 is moved so that it is elevated in the shape of a circular arc and in parallel centering on a shaft hole 8a of the arm 8 and a shaft hole 9a of the arm 9. Further, in a state in which the slit forming sector 41 has fully closed the partition plate opening 31 of the partition plate 3, as shown by FIG. 3, the rear face of the front end portion of the slit forming sector 41 of the close shutter sector group 4 is separated from the projection 32 and is brought into close contact with the face of the partition plate 3 by its own elastic force so that no gap is produced therebetween. Although in the presently described embodiment, the shutter sector groups are provided on the back face side of the base plate in an order of the open shutter sector group and the close shutter sector group, the invention can be executed similarly even with a shutter provided with the close shutter sector group and the open shutter sector arranged in an opposite order.

A focal-plane shutter according to the invention is not only capable of preventing a front end of a slit forming sector of a shutter sector group and an upper edge portion of an opening from being brought into contact with each other with certainty but achieves an effect in which the problem of leakage of light is not posed after closing the opening.

What is claimed is:

1. A focal-plane shutter for a camera, comprising: a base plate having a shutter opening formed therethrough; an open shutter sector group opposing a back side face of the base plate; a partition plate having a partition plate opening formed therethrough and opposing a back side face of the open shutter sector group; a close shutter sector group opposing a back side face of the partition plate; a sector holding plate having a holding plate opening formed therethrough and opposing a back side face of the close shutter sector group; a plurality of arms forming parallel link mechanisms for engaging the open shutter sector group and the close shutter sector group to execute an operation of opening and closing the shutter opening; and a projection for preventing sector collision formed either on one side of the partition plate so that sectors of one of the open shutter sector group and the close shutter group are opposed thereto or on a side of the sector holding plate to which sectors a of the close shutter sector group are opposed; wherein the projection is disposed so that a respective sector is brought into contact therewith prior to reaching an end portion of any one of the openings and from which the slit forming sector is separated when the respective shutter sector groups are fully closed.

2. A focal-plane shutter for a camera according to claim 1; wherein at least one of the base plate, the partition plate and the sector holding plate has a sidewall having a tapered shape in the opening formed therein so that a sector of the open shutter sector group and the close shutter sector group does not become engaged with the sidewall upon closing of the sector group.

3. A focal-plane shutter for a camera comprising: a base plate having a shutter opening formed therethrough; a close shutter sector group opposing a back side face of the base plate; a partition plate having a partition plate opening formed therethrough and opposing a back side face of the close shutter sector group; an open shutter sector group opposing a back face side of the partition plate; a sector holding plate having a holding plate opening formed therethrough and opposing a back side face of the open shutter sector group; a plurality of arms forming parallel link mechanisms for engaging the open shutter sector group and the close shutter sector group to execute an operation of opening and closing the shutter opening; and a projection for preventing sector collision formed either on one side of the partition plate so that sectors of one of the close shutter sector group and the open shutter group are opposed thereto or on a side of the sector holding plate to which sectors of the open shutter sector group are opposed; wherein the projection is disposed so that a respective sector is brought into contact therewith prior to reaching and end portion of any one of the openings and from which the sector is separated when the respective shutter sector groups are fully closed.

4. A focal-plane shutter for a camera according to claim 3; wherein at least one of the base plate, the partition plate and the sector holding plate has a sidewall having a tapered shape in the opening formed therein so that a sector of the open shutter sector group and the close shutter sector group does not become engaged with the sidewall upon closing of the sector group.

5. A focal plane shutter for a camera, comprising: a plate defining a shutter opening therethrough; at least one blade unit displaceable to cover and uncover a shutter opening, the blade unit having a leading blade and a plurality of trailing blades arranged in superposed relation to the leading blade; a plurality of arm members connected to the leading blade and the trailing blades to effect displacement of the leading blade and the trailing blades relative to the shutter opening; a plurality of pins pivotally connecting the arm members to the leading blade and the trailing blades; and a projection for preventing sector collision formed on the plate so that blades of a blade unit are opposed thereto, the projection being disposed so that a blade of a respective blade unit is brought into contact therewith prior to reaching and end portion of the shutter opening and from which the blade is separated when the respective blade unit is fully closed.

6. A focal plane shutter for a camera according to claim 5; wherein the at least one blade unit comprises a close shutter sector group and an opening shutter sector group.

7. A focal plane shutter for a camera according to claim 5; wherein the plate has a sidewall having a tapered shape in the opening formed therein so that a blade of the blade unit does not become engaged with the sidewall upon closing of the blade unit.

8. A focal plane shutter for a camera according to claim 5; wherein the plate comprises a base plate having a shutter opening formed therethrough and opposing a front side of the open shutter sector group, a partition plate having a partition plate opening formed therethrough and having a front side opposing a back side of the open shutter sector group and a back side opposing the close shutter sector group, and a sector holding plate having a holding plate opening formed therethrough and opposing a back side face of the close shutter sector group; wherein the projection is formed either on one side of the partition plate so that sectors of one of the open shutter sector group and the close shutter group are opposed thereto or on a side of the sector holding plate to which sectors of the close shutter sector group are opposed.

9. A focal-plane shutter for a camera according to claim 8; wherein at least one of the base plate, the partition plate and the sector holding plate has a sidewall having a tapered shape in the opening formed therein so that a sector of the open shutter sector group and the close shutter sector group does not become engaged with the sidewall upon closing of the sector group.

10. A focal plane shutter for a camera, comprising: a plate defining a shutter opening therethrough; at least one blade unit displaceable to cover and uncover a shutter opening, the blade unit having a leading blade and a plurality of trailing blades arranged in superposed relation to the leading blade; a plurality of arm members connected to the leading blade and the trailing blades to effect displacement of the leading blade and the trailing blades relative to the shutter opening; and a plurality of pins pivotally connecting the arm members to the leading blade and the trailing blades; wherein the plate has a sidewall having a tapered shape in the opening formed therein so that a blade of the blade unit does not become engaged with the sidewall upon closing of the blade unit.

11. A focal plane shutter for a camera according to claim 10; further comprising a projection for preventing sector collision formed on the plate so that blades of a blade unit are opposed thereto, the projection being disposed so that a blade of a respective blade unit is brought into contact therewith prior to reaching and end portion of the shutter opening and from which the blade is separated when the respective blade unit is fully closed.

12. A focal plane shutter for a camera according to claim 10; wherein the at least one blade unit comprises a close shutter sector group and an opening shutter sector group.

13. A focal plane shutter for a camera according to claim 10; wherein the plate comprises a base plate having a shutter opening formed therethrough and opposing a front side of the open shutter sector group, a partition plate having a partition plate opening formed therethrough and having a front side opposing a back side of the open shutter sector group and a back side opposing the close shutter sector group, and a sector holding plate having a holding plate opening formed therethrough and opposing a back side face of the close shutter sector group; wherein the projection is formed either on one side of the partition plate so that sectors of one of the open shutter sector group and the close shutter group are opposed thereto or on a side of the sector holding plate to which sectors of the close shutter sector group are opposed.

14. A focal-plane shutter for a camera according to claim 13; wherein at least one of the base plate, the partition plate and the sector holding plate has a sidewall having a tapered shape in the opening formed therein so that a sector of the open shutter sector group and the close shutter sector group does not become engaged with the sidewall upon closing of the sector group.

* * * * *